Oct. 24, 1961 — L. K. LOFTIN, JR — 3,005,339
WIND TUNNEL AIRSTREAM OSCILLATING APPARATUS
Filed Sept. 28, 1959 — 2 Sheets-Sheet 1
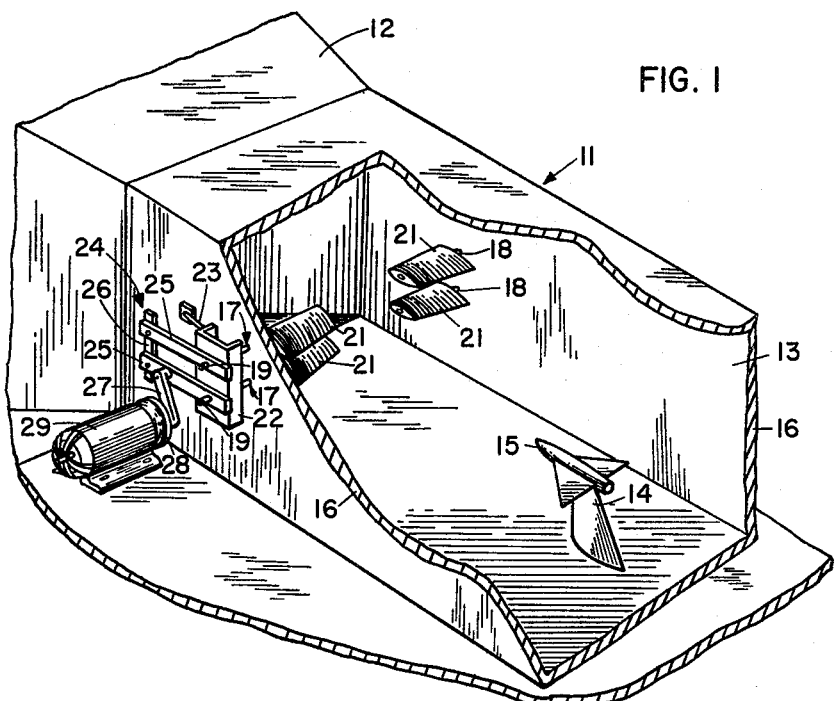
FIG. 1
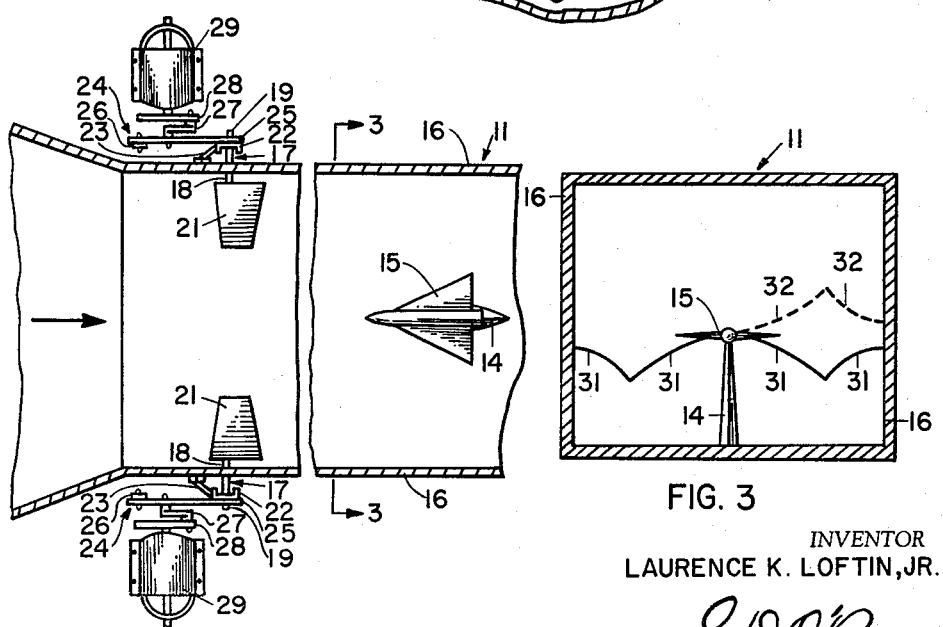
FIG. 2
FIG. 3
INVENTOR
LAURENCE K. LOFTIN, JR.
BY
ATTORNEYS

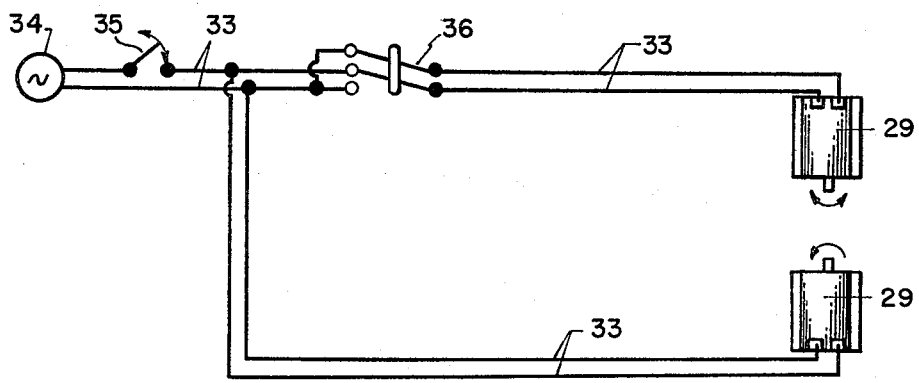
FIG. 4
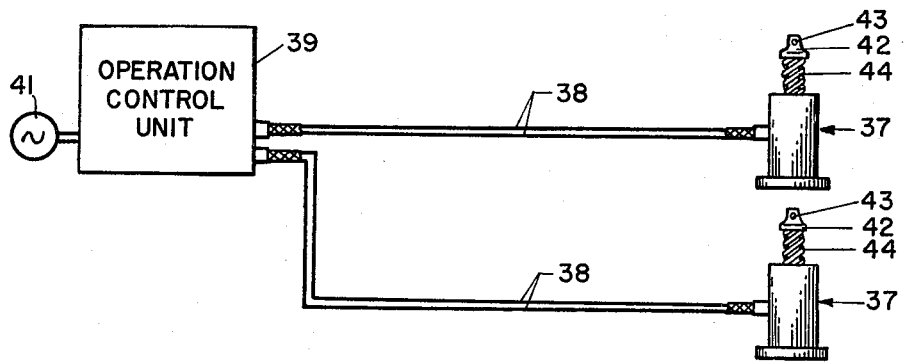
FIG. 5
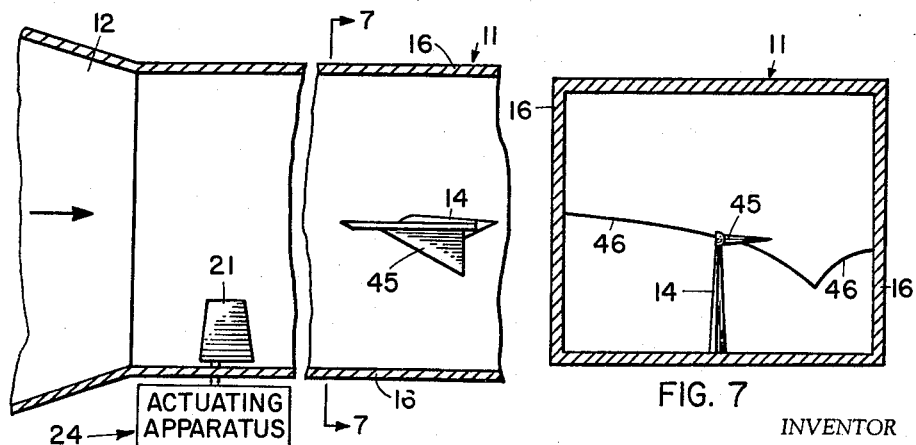
FIG. 6
FIG. 7
INVENTOR
LAURENCE K. LOFTIN, JR.

United States Patent Office 3,005,339
Patented Oct. 24, 1961

3,005,339
WIND TUNNEL AIRSTREAM OSCILLATING
APPARATUS
Laurence K. Loftin, Jr., Newport News, Va., assignor to the United States of America as represented by the Administrator of National Aeronautics and Space Administration
Filed Sept. 28, 1959, Ser. No. 843,022
6 Claims. (Cl. 73—147)
(Granted under Title 35, U.S. Code (1952), sec. 266)

The invention described herein may be manufactured and used by or for the Government of the United States of America for governmental purposes without the payment of any royalties thereon or therefor.

This invention relates generally to a wind tunnel air flow modulating device, and more particularly to apparatus for selectively generating wave motion in the air flow of a wind tunnel.

Wind tunnels have long been utilized in the field of aeronautics for investigating the flight characteristics of proposed aircraft configurations prior to the actual construction of a full scale prototype aircraft. These tunnels generally include a tubular channel of circular or rectangular cross-section arranged to form a closed-circuit air duct, and a fan to keep air moving around the circuit. The circuit generally comprises a long expanding portion downstream from the fan, followed by a short contraction cone, and then a throat section in which a small scale model of the proposed aircraft configuration is mounted in readily variable flight attitudes. In the design of these tunnels considerable ingenuity is exercised in arriving at a configuration that will contribute to the utmost possible uniformity and steadiness of the airstream throughout the throat area of the tunnel, since it has been found that accurate test measurements for most flight attitudes are difficult to obtain under other than steady air conditions. An aircraft in actual flight, however, repeatedly encounters substantially vertical air currents or gusts. In practice, it has been found that these gusts are vertically balanced in that a gust of given velocity directed generally upwardly or downwardly is offset by a gust of substantially equal velocity moving in the direction opposite to that taken by the anterior gust. Data has been gathered by instrumented aircraft, and tables have been prepared based thereon, which indicate the frequency that gusts of given velocity may be encountered under various conditions, and also the proportionate number of times that a gust of given velocity will occur out of the total number of gusts encountered. These studies further show the completely random nature of these vertical velocity components of atmospheric turbulence. Any single gust may move in either a substantially upwardly or substantially downwardly direction with a given effective velocity, and these characteristics are not dependent upon the direction and effective velocity of the gusts preceding and succeeding this single gust. Since the aerodynamic properties of the surfaces of an aircraft configuration are partially based upon the gust response characteristics thereof, and since the structural design of the surfaces may be directly influenced by gust loads, it is the current practice to determine the effect of these gusts upon the proposed configuration analytically, which is an extremely involved and time consuming operation. This invention is directed to means for inducing in a wind tunnel airstream a transverse turbulence wave sinusoidally varying in vertical velocity over a wide frequency range. The response of a small scale model to this turbulence may be measured to determine experimentally the transfer function of a proposed aircraft configuration. The transfer function thereby determined may be equated with the known characteristics of atmospheric gust turbulence, and the loads, stresses, and motions of a prototype aircraft flying through rough air may be calculated by a quick and drastically simplified analytical operation.

One heretofore proposed apparatus for performing an empirical transfer function determination contemplates the use of a plurality of parallel slats positioned horizontally across the entire width of a wind tunnel section and adapted to be oscillated in phase for generating transverse wave motion in the airflow through the tunnel. Although this concept is considered an advance in the art of experimentally determining the gust response characteristics of an aircraft configuration, the particular apparatus employed is inherently limited in that the amplitude of the downwash thereby generated is insufficient for test and measurement purposes. Accordingly, this invention is directed to a new and improved vane system for generating downwash wave motion in a wind tunnel airstream, and an actuating apparatus connected between the vane system and a suitable driving device.

It is an object of the instant invention to provide apparatus for selectively generating transverse wave motion in an enclosed air flow.

Another object of the present invention is to provide oscillatory vane means and actuating mechanism therefor for generating variable sinusoidal transverse wave motion in a wind tunnel airstream.

A further object is to provide apparatus for selectively modulating the air flow within a wind tunnel.

Other objects and many of the attendant advantages of this invention will be readily appreciated as the same becomes better understood by reference to the following detailed description when considered in connection with the accompanying drawings wherein:

FIG. 1 is an isometric view, partially in section, of a wind tunnel test section provided with the airstream oscillating apparatus of the instant invention;

FIG. 2 is a plan view of the wind tunnel section of FIG. 1 with the upper enclosure surface thereof removed;

FIG. 3 is a transverse sectional view of the wind tunnel test section taken along the line 3—3 of FIG. 2;

FIG. 4 is a schematic representation of a wiring circuit connecting a source of electrical energy to the electric motor driving device of FIGS. 1 and 2;

FIG. 5 is a schematic representation of an alternative and preferred actuating apparatus driving device, connected through a control unit to a source of electrical energy;

FIG. 6 is a fragmentary plan view of an alternative embodiment of the wind tunnel section shown in FIG. 1, with the upper enclosure surface thereof removed; and FIG. 7 is a transverse sectional view of the wind tunnel test section taken along the line 7—7 of FIG. 6.

Referring now more particularly to the drawings wherein like reference numerals designate identical parts throughout the several views, and more particularly to FIGS. 1 and 2, there is shown a portion of a wind tunnel, generally designated by the reference numeral 11, having a contraction cone section 12 and a throat section 13. The throat section 13 is also utilized as the tunnel test section, and a faired mounting element 14 is provided therein, upon which a small scale model 15 of a proposed aircraft configuration may be adjustably mounted. A flow of air moves in the direction indicated by the arrowhead from the contraction cone section 12 into throat section 13 and passes over model 15. The throat section 13 is provided with opposed side walls 16, and a pair of shaft members; generally designated by the reference numeral 17, are rotatably mounted in vertically spaced relation in apertures provided in each of the side walls 16 and perpendicularly thereto. Each of the shaft members 17 in one wall 16 is aligned with a corresponding member 17 in the opposed wall 16. One end 18 of each of the members 17 projects a short distance within the interior of tunnel 11, while the other end 19 thereof projects exteriorly from the tunnel 11. A vane 21 is fixedly connected to the projecting end 18 of each of the members 17 and forms an extension thereof; each vane 21 extending substantially horizontally into wind tunnel 11 a distance less than half the width thereof between the opposed side walls 16.

The vanes 21 preferably have the shape of an airfoil in section, and are provided with a leading edge adjacent the upstream end of throat section 13, and also a trailing edge. In planform, each of the vanes 21 are preferably tapered from the root section adjacent the wall 16 outwardly to the tip section, and an extension of the centerline of each of the shaft members 17 corresponds approximately with the aerodynamic center of the vane 21 connected thereto. A vertical support member 22 having a pair of spaced apertures formed therein is connected to the exterior surface of each side wall 16 by means of bracket members 23. The ends 19 of the shaft members 17 rotatably extend through individual apertures in the members 22. Actuating apparatus for rotatively oscillating the shaft members 17, generally indicated by the reference numeral 24, includes an arm member 25 rigidly connected perpendicularly at one end thereof to the end 19 of each of the shaft members 17 projecting through the apertures of support members 22; each of the arm members 25 being substantially equal in length. The arms 25 are connected to the members 17 at such a radial position that the arms are disposed in parallel, substantially horizontal relation when the vanes 21 connected to the end 18 of the members 17 are positioned in parallel, horizontal relation. The free ends of each pair of arms 25 is pivotally interconnected by a link member 26. The distance between the pivotal connection points of each link member 26 is preferably made equal to the vertical spacing between the shaft members 17. In addition, the pivotal connection points at the free end of each of the arms 25 are preferably equidistantly spaced from the centerlines of the shaft members 17 to which the arms are connected. Apparatus 24 further includes an actuator bar 27 pivotally connected at one end thereof to the lower arm member 25 on each side of throat section 13 near the free end thereof, and extending substantially vertically downwardly therefrom. The lower end of each actuator bar 27 is connected to a driving device, operable to produce substantially vertical reciprocating motion of the upper end of bar 27 at its pivotal connection to an arm member 25. The driving device shown in FIGS. 1 and 2, and which constitutes part of actuating apparatus 24, comprises a wheel 28 rigidly connected to the shaft of an electric motor 29. The lower end of actuator bar 27 is pivotally connected to wheel 28 near the rim thereof, and as the wheel rotates, the upper end of bar 27 moves as hereinbefore described. This movement of actuator bar 27 causes the arm member 25 pivotally connected thereto to induce reciprocating rotary motion in the shaft member 17 rigidly connected to the end of the arm member 25. Since the arm members 25 on each side of throat section 13 are connected by the link members 26, similar motion will be induced in the upper shaft members 17. The vanes 21 connected to the ends 18 of shaft members 17 are thus caused to oscillate.

The oscillatory motion of vanes 21 is preferably limited, by proper design of the actuating apparatus 24, to approximately 10 degrees in each direction from the horizontal, since rotary displacement of the vanes 21 above this limit may result in the development of stall conditions as the airflow moves over the vanes. As will be explained more fully hereinbelow, the vanes 21 on each side of throat section 13 may be oscillated in phase, or the vanes on one side of section 13 may be oscillated 180 degrees out of phase with respect to the vanes on the other side of section 13. When the vanes on each side of section 13 oscillate in phase, symmetrical transverse wave motion is generated in the flow of air through throat section 13. The amplitude of the wave varies across the width of section 13, since the downwash developed by vanes 21 is larger at the tips than at the root sections. The solid line 31, FIG. 3, indicates the relative magnitude of the wave pattern across section 13 due to downwash developed by vanes 21 when the angle of attack thereof is positive, relative to the tunnel airstream. When the vanes 21 on opposite walls 16 of section 13 are oscillated 180 degrees out of phase, the angle of attack of the vanes on opposed walls 16 are opposite in sign, and the transverse wave motion in the tunnel airstream becomes unsymmetrical, as indicated by the broken line 32. The flow pattern across the model 15 generated by this out of phase vane oscillation is desirable in simulating in the tunnel non-uniform gust conditions which a prototype aircraft may encounter in flight.

The amplitude of the wave motion in the airstream generated by oscillation of the vanes 21 remains substantially constant as the flow of air moves through the throat section 13. Consequently, the model 15 may be positioned downstream from vanes 21 any convenient distance, but the transverse position of the model 15 within the tunnel, and the scale of the model and the size of vanes 21 relative to the tunnel width should be such that vane oscillation of approximately 10 degrees will result in airstream oscillation about model 15 on the order of 1 degree, which closely approximates gust oscillation of the airstream about an aircraft in flight. As an example, in a transonic wind tunnel having a throat section sixteen feet wide and utilizing oscillating vanes projecting three feet into the airstream, a model 15 having a four foot span may be positioned as much as fifty feet downstream of the vanes.

The connection of the driving device motors of FIGS. 1 and 2 to a source of electrical energy is schematically set forth in FIG. 4. The motors 29 are connected by conductors 33 to a common source of electrical current 34 through a switch 35. A pole changer switch 36 is placed in the conductors 33 leading to one of the motors 29, thereby providing for selective reversal of the direction of rotation of the shaft of this motor by changing the setting of pole changer switch 36. The direction of rotation of the motors 29 may thus be selectively varied for oscillating the vanes 21 on each side of the throat section 13 in the same or in opposed directions.

FIG. 5 is a schematic representation of an alternative and preferred driving means which may constitute a part of actuating apparatus 24 in lieu of the wheel 28 and motor 29. A conventional solenoid, generally designated by the reference numeral 37, is provided on each side of throat section 13, each solenoid 37 being connected by conductors 38 to an operation control unit 39, which in turn is connected to a source of electrical energy 41. Each solenoid 37 is provided with a plunger 42 composed of a magnetizable metal, such as soft iron or the like. A transverse aperture 43 is provided in the upper end of plunger 42, and plunger 42 is pivotally connected to the lower end of actuator bar 27 by a bolt or the like extending through aperture 43. Each solenoid 37 is further provided with spring means 44 arranged to normally maintain plunger 42 withdrawn from the exciting coil of solenoid 37. Electrical current may be introduced into the solenoid coil, whereupon the plunger 42 is drawn into the core thereof. The length of the stroke of plunger 42 can be controlled by varying the amount of current flow to the solenoid coil, since the force acting to overcome the resistance of spring means 44 and to draw plunger 42 into the coil becomes greater as the current flow increases. The length of plunger 42 and the coil is such that, with the upper end of plunger 42 pivotally connected to the lower end of actuator bar 27, the full vertical movement of plunger 42 causes oscillation of the vanes 21 approximately 10 degrees in each direction from the horizontal.

The operation control unit 39 includes conventional programming means such as magnetic or perforated instruction tapes, punched cards, or the like, which are operable to vary the current flow to the coil of the solenoids 37. Separate programming means may be provided for each solenoid, or a single common means may be used to vary the current flow simultaneously in each of the solenoids.

The use of the solenoid driving device in actuating apparatus 24 is preferable to the use of the driving device comprising wheel 28 and motor 29 because of its capability of generating a nonuniform oscillatory motion of the vanes 21. Air gusts in the atmosphere vary over a considerable range of vertical velocities, and the percent of gusty or still air varies with the seasons and route over which an airplane operates. Varying the degree of rotation and the rotational velocity of the vanes 21 varies the frequency and amplitude of the airstream passing over model 15, which thus may be made to accurately simulate the effect of gusts upon an aircraft in flight. The programming means included in the operation control unit may be correlated with gust readings measured by means of accelerometers mounted on test aircraft in actual flight, or correlated with gust data contained in statistical tables prepared from such accelerometer readings. The variation of current flow in the coils of the solenoids 37 controlled by the programming means may thus be such that the desired oscillatory motion of the vanes 21 is thereby obtained.

An alternate arrangement of the wind tunnel airstream oscillating device is shown in FIG. 6. The tunnel 11 is the same as that shown in FIGS. 1 and 2, but with only one pair of vanes 21 rotatably mounted on one side wall 16 of the throat section 13. A small semi-span scale model 45 of the configuration under test is adjustably mounted upon the faired mounting element 14, and extends into the side of throat section 13 provided with the vanes 21. The actuating apparatus 24 for oscillating these vanes, shown schematically in this figure, may include a driving device of the type shown in FIG. 4 or of the type shown in FIG. 5.

The solid line 46, FIG. 7, indicates the relative magnitude of the wave pattern generated in the flow of air moving through throat section 13 due to downwash developed by oscillation of the vanes 21. The wave pattern set up in the airflow by this vane arrangement is considered to be suitable in measuring the gust response characteristics of the semi-span scale model 45 of the proposed aircraft configuration.

Although the airstream oscillating apparatus of this invention has been described as consisting of only a pair of vanes projecting through each side wall, it is to be understood that this number of vanes is only by way of example, and not limitation, and that the invention contemplates the utilization of one or more vanes.

Obviously, many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A wind tunnel comprising an elongated tubular channel having opposed side walls for enclosing a flow of air, a plurality of vanes mounted in spaced, vertical relation on one of said side walls and projecting horizontally into said channel a distance less than half the width thereof, and means for producing oscillatory pitching motion of said plurality of vanes within predetermined limits angularly measured in each direction from the horizontal, thereby generating transverse sinusoidal wave motion in said flow.

2. The wind tunnel of claim 1 and including a second plurality of vanes mounted on the other of said side walls and projecting horizontally into said channel a distance less than half the width thereof, said second plurality of vanes being longitudinally aligned with and spaced from said first plurality of vanes, and means for producing oscillatory pitching motion of said second plurality of vanes within predetermined limits angularly measured in each direction from the horizontal.

3. The wind tunnel of claim 2 and including means for selectively establishing a predetermined oscillatory motion phase relationship between said first and second plurality of vanes.

4. A wind tunnel comprising an elongated tubular channel having opposed side walls for enclosing a flow of air, one of said side walls having vertically spaced apertures formed therein, a plurality of shaft members rotatably positioned in said apertures and horizontally projecting from each side of said wall substantially perpendicularly thereto, a vane connected to the end of each of said shaft members projecting into the interior of said channel and forming an extension thereof, said vanes projecting substantially horizontally into said channel a distance less than half the width thereof in spaced, substantially parallel relation, and means connected with the other end of said shaft members for producing reciprocating rotary motion therein within predetermined limits angularly measured in each direction from the horizontal.

5. The wind tunnel of claim 4 and including a plurality of shaft members rotatably positioned in vertically spaced apertures in the other of said side walls and horizontally projecting from each side of said wall substantially perpendicularly thereto, each shaft member in said other side wall being longitudinally aligned with a corresponding shaft member in said one side wall, a vane connected to the end of each of the shaft members rotatably positioned in said other side wall projecting into the interior of said channel and forming an extension thereof, said vanes associated with said other side wall projecting substantially horizontally into said channel a distance less than half the width thereof in spaced, substantially parallel relation, and means connected with the other end of said shaft members associated with said other side wall for producing reciprocating rotary motion therein within predetermined limits angularly measured in each direction from the horizontal.

6. A wind tunnel comprising an elongated tubular channel having opposed side walls for enclosing a flow of air, a pair of tubular members rotatably secured in vertically spaced apertures in each of said side walls and horizontally projecting from each side of each of said walls substantially perpendicularly thereto, a vane connected to the end of each of said tubular members projecting into the interior of said channel and forming an extension thereof, said vanes projecting horizontally into said channel a distance less than half the width thereof in spaced, substantially parallel relation, an arm rigidly connected to the other end of each of said tubular members substantially perpendicularly thereto, said arms being substantially equal in length and being disposed in substantially parallel relation, a rigid link pivotally connected at one end thereof to the free end of one of said arms of each pair and pivotally connected at the other end thereof to the free end of the other of said arms of each pair, and means for inducing reciprocating rotary motion in one of said arms of each pair within predetermined limits angularly measured in each direction from the horizontal.

References Cited in the file of this patent

UNITED STATES PATENTS 2,911,787    Barry ---------------- Nov. 10, 1959

FOREIGN PATENTS 449,148    Great Britain ----------- Mar 15, 1935